United States Patent
Hanajima et al.

(10) Patent No.: US 6,392,638 B2
(45) Date of Patent: *May 21, 2002

(54) INFORMATION PROCESSING APPARATUS AND DISPLAY CONTROL METHOD OF THE SAME INFORMATION PROCESSING APPARATUS

(76) Inventors: Mitsuru Hanajima; Jochiku Muraoka, both of Sony Corporation, 7-35 Kitashinagawa 6-chome, Shinagawa-Ku, Tokyo 141 (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,191

(22) Filed: Jan. 13, 1999

(30) Foreign Application Priority Data

Jan. 16, 1998 (JP) .......................................... 10-006772

(51) Int. Cl.[7] ................................................ G09G 5/00
(52) U.S. Cl. ...................... 345/173; 345/179; 345/174; 178/18.03; 178/19.03
(58) Field of Search ................................. 345/156, 157, 345/158, 173, 179; 178/18.01, 18.02, 18.03, 19.01, 19.02, 19.03, 19.04

(56) References Cited

U.S. PATENT DOCUMENTS

| | | | |
|---|---|---|---|
| 4,931,965 A | * 6/1990 | Kaneko et al. | 364/560 |
| 5,825,352 A | * 10/1998 | Bisset et al. | 345/173 |
| 5,844,547 A | * 12/1998 | Minakuchi et al. | 345/173 |
| 5,903,229 A | * 5/1999 | Kishi | 341/20 |
| 5,933,134 A | * 8/1999 | Shich | 345/173 |

* cited by examiner

Primary Examiner—Richard Hjerpe
Assistant Examiner—Kimnhung Nguyen
(74) Attorney, Agent, or Firm—Frommer Lawrence & Haug LLP; William S. Frommer; Joe H. Shalkenburger

(57) ABSTRACT

The present invention discloses an information processing apparatus comprising a display device to display images and a touch panel device to output signals for a depressing position and a depressing pressure. The images of the icons that are displayed are changed depending on the output from the touch panel device. The composite icon display control is determined for the depressing pressure level information as the comparison result of the depressing pressure and reference depressing pressure and depressing position change information as the monitoring result of depressing position in addition to the depressing position information of the touch panel device. When the touch panel is depressed with a weak pressure, the icon corresponding to the depressing position is displayed in the highlight display mode. In addition, when the touch panel is depressed with a higher pressure to move the depressing position corresponding to the knob of an icon of the varying device such as a slide volume having the knob, both knob position and amount of control of the varying device change following the movement of the depressing position.

7 Claims, 8 Drawing Sheets

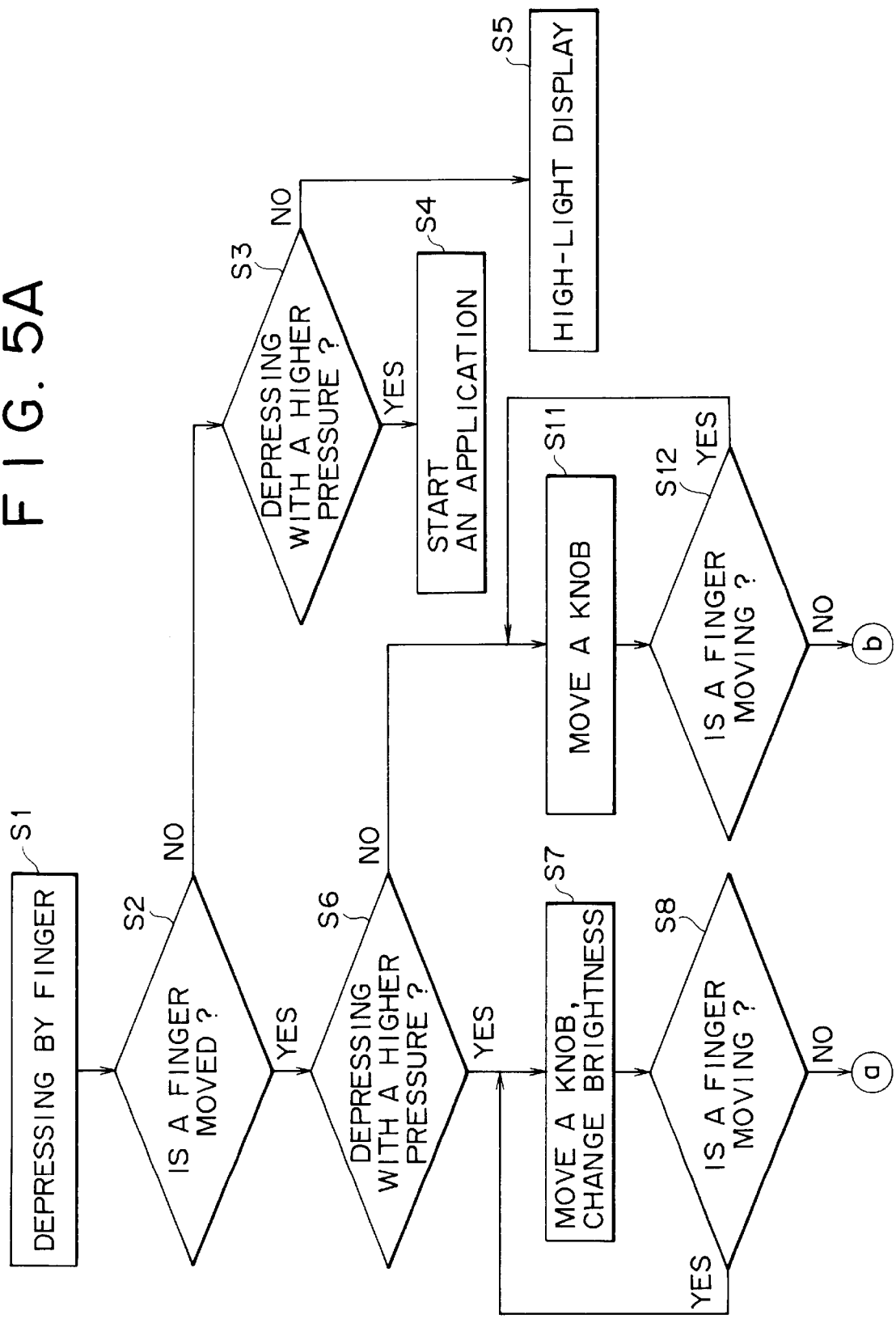

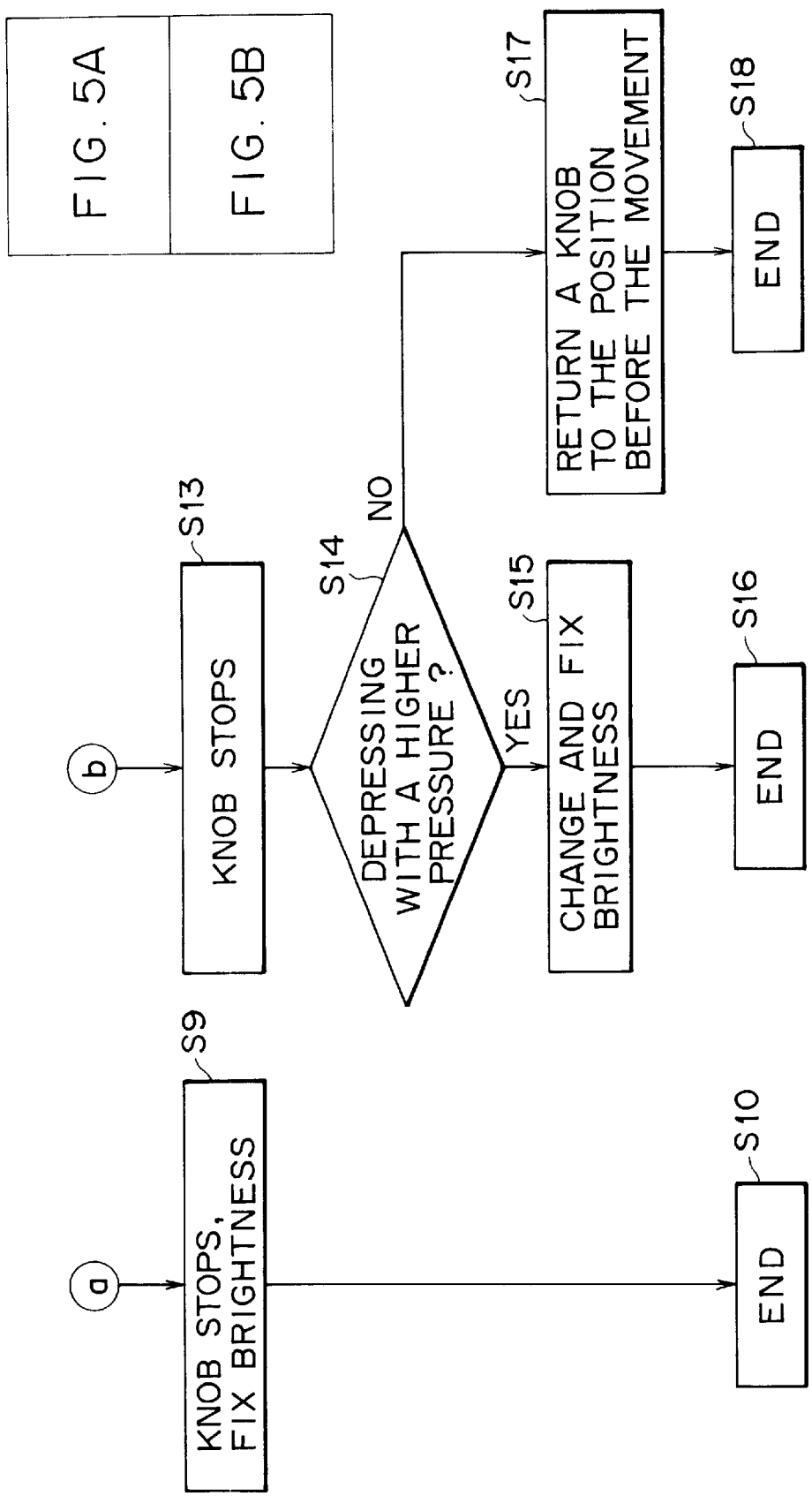

INITIAL DISPLAY IMAGE

⇩ HIGH-LIGHT DISPLAY PROCESS

HIGH-LIGHT DISPLAY IMAGE

INITIAL DISPLAY IMAGE
(HIGH-LIGHT DISPLAY)

⇩ ICON IS DRAGGED

REARRANGED DISPLAY IMAGE

INFORMATION PROCESSING APPARATUS AND DISPLAY CONTROL METHOD OF THE SAME INFORMATION PROCESSING APPARATUS

BACKGROUND OF THE INVENTION

1. Field of the Invention

The present invention relates to an information processing apparatus provided with a touch panel device and a method of controlling display of a display device of the same information processing apparatus.

2. Description of the Related Art

A touch panel device has widely been used in combination with a mouse as an input device of a personal computer. In many cases, a touch panel device has a structure that a transparent touch panel is laid over the display screen of a liquid crystal display device and thereby a depressing position signal indicating the depressing position can be output to a personal computer when a user depresses various positions on the touch panel with fingers.

Here, images of manipulating buttons are displayed through a personal computer on the display screen of display device. A user can depress the position of the particular manipulating button on the touch panel with a finger. As a result, the depressing position signal indicating the depressing position is output from the touch panel device. Therefore, the personal computer recognizes with this signal that the particular manipulating button is depressed with a finger and executes the predetermined process corresponding to the manipulated button.

The depressing position of the touch panel device can be detected by propagating surface elastic wave, for example, to the touch panel and then detecting change of the surface elastic wave when the touch panel is depressed. Moreover, a certain kind of touch panel device outputs a depressing pressure signal indicating a depressing pressure by detecting a depressing force of the touch panel, but in general, the touch panel which detects only the depressing position is widely used as an input device of the personal computer.

When a mouse is used as an input device, not only designation of the position on the display screen but also various kinds of manipulation such as click or double-click of right and left buttons of mouse or drag and drop can be realized. Therefore, various processes can be switched for execution in the personal computer side depending on the respective manipulation.

Namely, when the left button is clicked (step S101) as shown in FIG. 8, a personal computer selects and executes any one of the process A (step S103) and process B (step S104) depending on the decision that the left button is double-clicked or not (step S102). As the process A, an application program (or application), for example, is executed, while as the process B, high-light display of double-clicked icon image(or icon), for example, is executed.

Moreover, in the case of the manipulation (step S105) in which the mouse is only slid as shown in FIG. 9, a personal computer selects and executes any one of the process C (step S107) and the process D (step S108) depending on the decision that the drag manipulation (the mouse is moved while the mouse button is being depressed) is executed or not (step S106). As the process C, a personal computer moves, for example, the icon and mouse cursor simultaneously, while as the process D, only a personal computer moves only the mouse cursor.

SUMMARY OF THE INVENTION

As explained above, when a mouse is used, diversified manipulations can be enabled but when a touch panel is used, only selection of process depending on the depressing position on the touch panel can be realized on the basis of the depressing position signal sent from the touch panel device. In other words, only simple manipulation, such as selection of necessary process by displaying a process menu on the display screen, has been permitted.

It is therefore an object of the present invention to eliminate such disadvantages of the related art and provide an information processing apparatus which has realized various manipulations of the touch panel and a method of controlling the display of a display device of the same information processing apparatus.

The present invention discloses an information processing apparatus comprising a display device for displaying images in relation to the predetermined processes among a plurality of processes, a touch panel device for outputting both depressing position signal and depressing pressure signal to control the display of the display device depending on an output from the touch panel device, further comprising a comparing means for comparing a depressing force indicated by the depressing signal with a reference pressure, a monitoring means for judging change of depressing position by monitoring the depressing position signal, a processing means for processing the control of display of the display device depending on touch panel device output, comparing means output and monitoring means output and a control means for controlling the display device depending on touch panel means output and processing means output to variously alter the display images of the display device by the touch manipulation to the touch panel device.

Moreover, the present invention discloses an information processing apparatus comprising a display device for displaying images in relation to the predetermined process among a plurality of processes and a touch panel device for outputting both depressing position signal and depressing pressure signal to control the display of the display device depending on an output of the touch panel device, further comprising a comparing means for comparing a depressing pressure indicated by a depressing pressure signal with the reference pressure, a monitoring means for judging change of depressing position by monitoring a pressing position signal, a processing means for controlling control of luminance of image displayed on the display device depending on the comparing means output and monitoring means output and a display control means for controlling the display device depending on the touch panel means output and processing means output to increase the luminance of images corresponding to the depressing position when the touch panel device is depressed with a weak pressure.

Moreover, the present invention discloses an information processing apparatus comprising a display device for displaying images in relation to the predetermined process among a plurality of processes and a touch panel device for outputting both depressing position signal and depressing pressure signal to control the display of the display device depending on output of the touch panel device, further comprising a comparing means for comparing a depressing pressure indicated by a depressing pressure signal with the reference pressure, a monitoring means for judging change of depressing position by monitoring a depressing position signal, a processing means for processing control of a varying means having control knob displayed on the display device depending on touch panel device output, comparing means output and monitoring means output and a display control means for controlling the display device depending on touch panel means output and processing means output to allow the image corresponding to the control knob and amount of control of varying means to change following the depressing position when the surface of touch panel device corresponding to the position of control knob of the varying means is depressed with a higher pressure.

Moreover, the information processing apparatus of the present invention uses, as a touch panel device, a touch panel provided over the display device.

Moreover, the information processing apparatus of the present invention comprises a process selecting means which is structured by a memory storing program data for a plurality of processes and a CPU for controlling the execution of a plurality of processes.

Moreover, the present invention discloses a method of controlling display of an information processing apparatus comprising a display device for displaying images in relation to the predetermined process among a plurality of processes and a touch panel device for outputting both depressing position signal and depressing pressure signal to control display of the display device depending on output of the touch panel device, comprising comparing step for comparing a depressing pressure indicated by a depressing pressure signal with the reference pressure, monitoring step for judging change of depressing position by monitoring the depressing position signal, luminance processing step for controlling luminance of image in relation to the predetermined process displayed on the display device depending on the touch panel device output, comparing step result and monitoring step result to increase the luminance of images corresponding to the depressing position when the touch panel device is depressed with a weak pressure.

Furthermore, the present invention discloses a method of controlling the display of an information processing apparatus comprising a display device for displaying images in relation to the predetermined process among a plurality of processes and a touch panel device for outputting both depressing position signal and depressing pressure signal to control the display of the display device depending on output of the touch panel device, comprising comparing step for comparing a depressing pressure indicated by a depressing pressure signal with the reference pressure, monitoring step for judging change of depressing position by monitoring a depressing position signal and a varying means control processing step for processing the control of varying means having a control knob displayed on the display device depending on the touch panel device output, comparing step result and monitoring step result to allow both image corresponding to the control knob and amount of control of varying means to change following the depressing position when the surface of touch panel device corresponding to the image position of the control knob of varying means is depressed with a higher pressure.

BRIEF DESCRIPTION OF THE DRAWINGS

FIG. 5 is a flowchart showing operation of an embodiment of the information processing apparatus of the present invention.

DETAILED DESCRIPTION OF THE INVENTION

Next, a preferred embodiment of the present invention will be explained with reference to the accompanying drawings.

Figure 1:
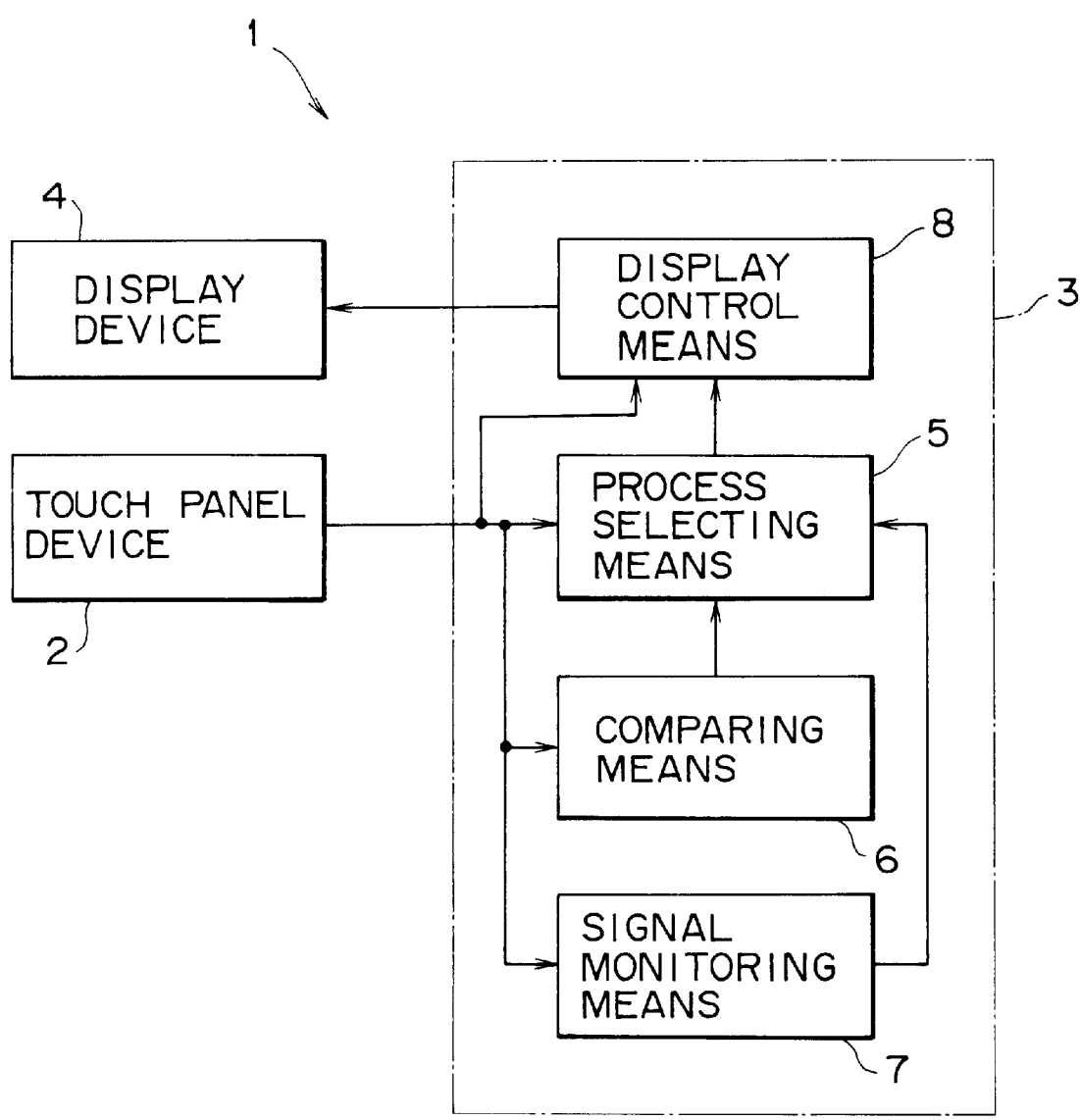
FIG. 1 is a block diagram showing an example of the information processing apparatus of the present invention.
Figure 2:
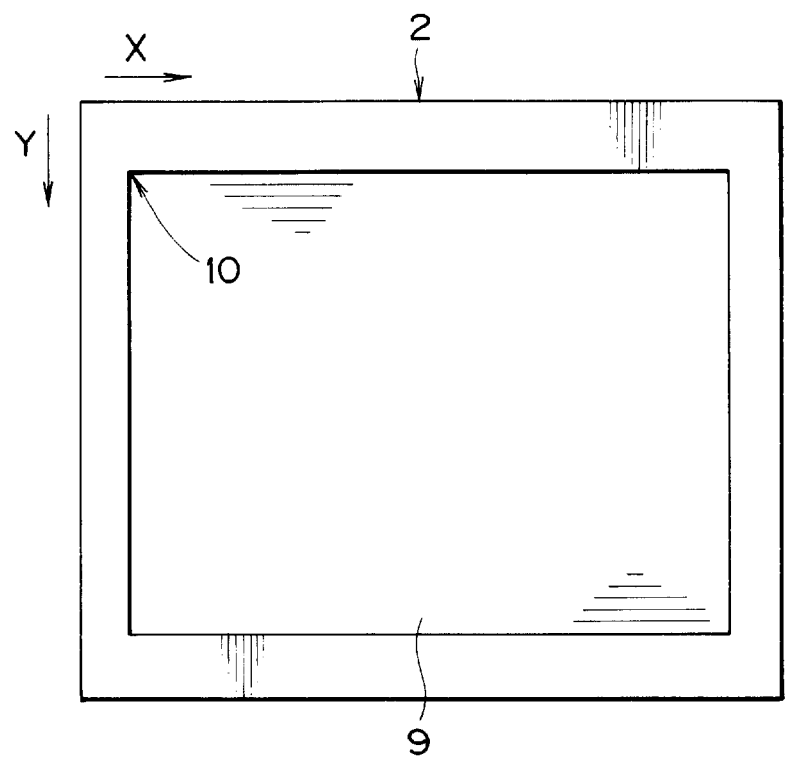
FIG. 2 is a plan view showing a touch panel device.
Figure 3:
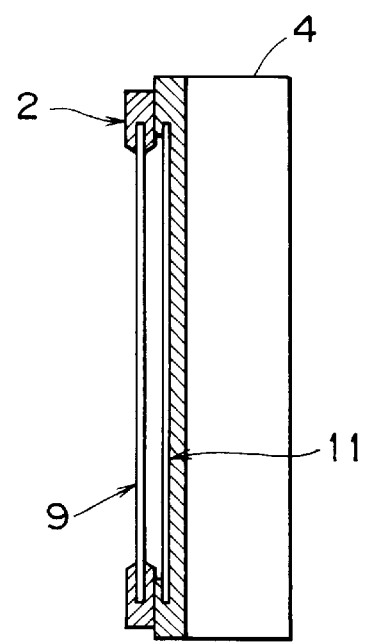
FIG. 3 is a side elevation of cross-section showing the touch panel device.

FIG. 1 is a block diagram showing an example of the information processing system of the present invention. FIG. 2 is a plan view showing the touch panel device. FIG. 3 is a side elevation of cross-section.

As shown in FIG. 1, the information processing apparatus 1 as an embodiment of the present invention is structured by a touch panel device 2, a personal computer 3 to which the touch panel device 2 is connected as an input device and a display device 4 connected to the personal computer 3.

Figure 4:
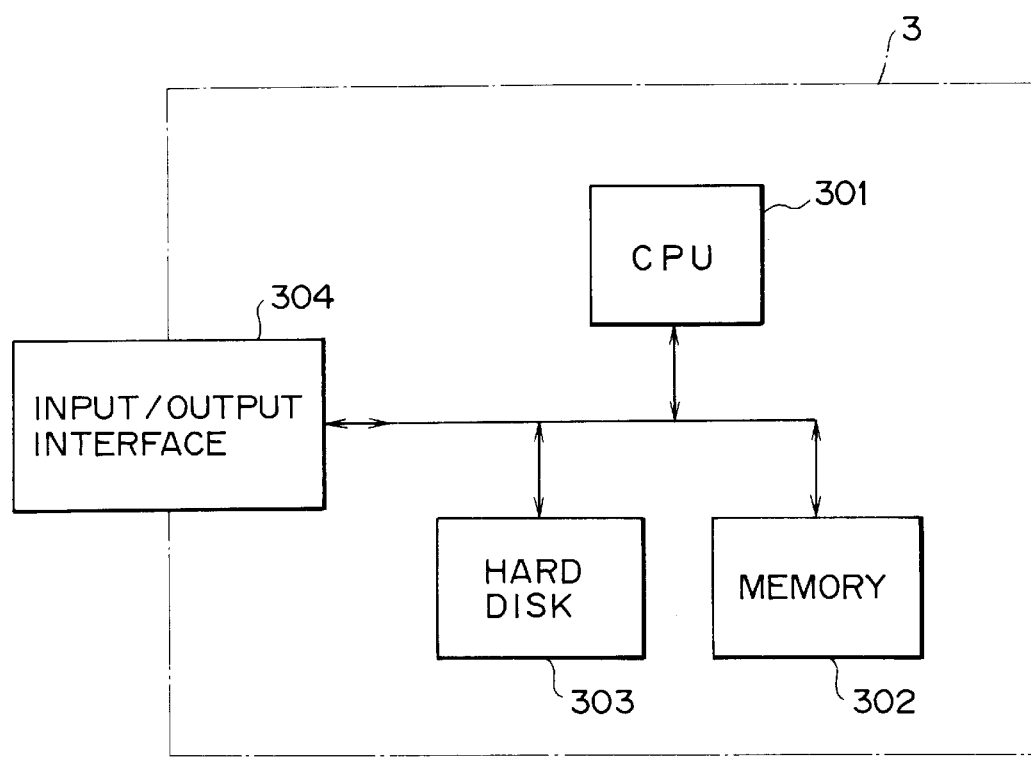
FIG. 4 is a block diagram showing a structure of a personal computer 3 to be used as an embodiment of the present invention.

The personal computer 3 is composed of a well known CPU (Central Processing Unit) 301, a memory 302, an interface 304 and a hard disk drive 303 as shown in FIG. 4. CPU 301 executes processes of various applications through operation based on the program data loaded to the memory 302 and also realizes the processes of each function shown in FIG. 1, namely the process selecting means 5, comparing means 6, signal monitoring means 7 and display control means 8.

The touch panel device 2 is structured by a rectangular transparent touch panel 9 as shown in FIG. 2 and the depressing position of the touch panel device 2 can be detected by propagating the surface elastic wave to this touch panel 9 and then detecting change of the surface elastic wave when the touch panel 9 is depressed by a finger. As a result of detection, the touch panel device 2 outputs a depressing position signal to the personal computer 3. The depressing position signal indicates the coordinate value in the y direction orthogonal to the X and y directions of the coordinates where the left upper corner is defined as the origin on the touch panel 9 shown in FIG. 2.

The touch panel device 2 also detects a depressing pressure when the touch panel 9 is depressed with a finger and then supplies a depressing pressure signal indicating the detected depressing pressure to the personal computer 3.

The display device 4 is structured by a liquid crystal display device in this embodiment and the touch panel device 2 is formed by providing the touch panel 9 parallel to the liquid panel 11 on the display screen, namely on the liquid crystal panel 11.

The display control means 8 realized by the personal computer 3 displays images of a plurality of icons corresponding to various kinds of application in this embodiment on the different positions on the display screen (liquid crystal panel 11) of the display device 4. Moreover, the display control means 8 modifies display images such as high-light display of icons with an instruction issued from the process selecting means 5.

The process selecting means 5 realized by the personal computer 3 selects different process depending on the depressing position indicated by the depressing position signal from the touch panel device 2 and also selects the process to be executed on the basis of the depressing pressure indicated by the depressing pressure signal from the touch panel device 4.

In more details, the comparing means 6 determines whether the depressing pressure indicated by the depressing pressure signal from the touch panel device 2 has exceeded the reference depressing pressure or not and the process selecting means 5 selects the process to be processed on the basis of the result of decision of this comparing means 6.

Moreover, the signal monitoring means 7 monitors the depressing position signal from the touch panel device 2 to detect whether the position indicated by the depressing position signal has changed or not and the process selecting means 5 selects the process to be executed on the basis of the detection result of the signal monitoring means 7 in combination with the decision result of the comparing means 6.

Next, operation of the information processing apparatus structured as explained above will be explained.

FIG. 5 is a flowchart showing operation of the information processing apparatus 2.

When this information processing apparatus 1 is activated, the display control means 8 displays a plurality of icons corresponding to different applications through the change of position on the liquid crystal panel 11 of the display device 4. Moreover, in this embodiment, an image of slide volume for adjusting luminance of image is displayed at the predetermined position.

Figure 6A:
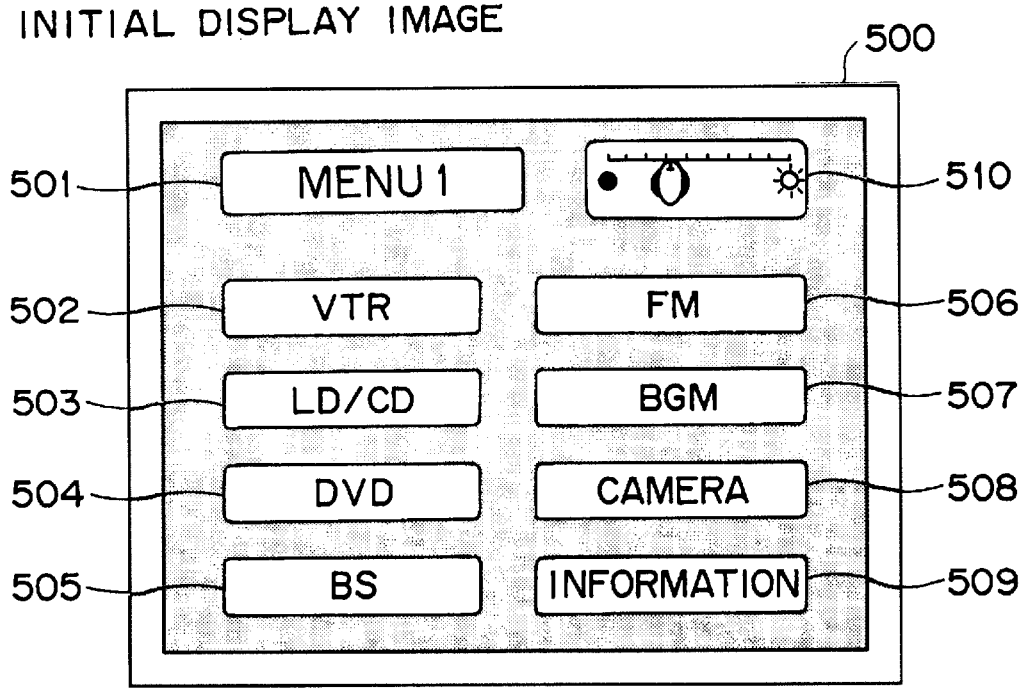
FIG. 6 is a diagram showing an example of a menu image displayed on the display device of the information processing apparatus of the present invention.

In this case, an example of the initial image displayed on the display device 4 is shown in FIG. 6A.

This initial image is an AV device control menu image 500 for controlling an AV (audio/video) device among a plurality of functions of the information processing apparatus.

The menu image 500 includes a menu number label 501, a VTR icon 502 for controlling video tape recorder, an LD/CD icon 503 for controlling a laser disk/compact disk, a DVD icon 504 for controlling DVD, a BS icon 505 for controlling satellite broadcast reception, an FM icon 506 for controlling FM broadcast reception, a BGM icon 507 for controlling broadcast reception of BGM (Background Music), a CAMERA ICON 508 for controlling image pickup by a camera and broadcast, an INFORMATION icon 509 for controlling information reception in LAN (Local Area Network) and a slide volume icon 510 for adjusting brightness of display of the display device 4.

When a user depresses the position of any icon of menu image 500, for example, the VTR icon 502 on the touch panel (step S1), the touch panel device 2 outputs to the personal computer 3 the depressing position signal indicating the depressing position on the touch panel 9 and the depressing pressure signal indicating the depressing pressure to the touch panel 9.

The signal monitoring means 7 monitors the depressing position signal from this touch panel device 2 and detects (step S2) whether the position indicated by the depressing position signal has changed or not. Therefore, when a user depresses the position of VTR icon and then slides the finger in direct, the signal monitoring means 7 detects change of the depressing position. On the other hand, when a user depresses the position of the VTR icon 502 but does not slide the finger, the signal monitoring means 7 does not detect change of the depressing position.

Here, if a user does not move the finger, the signal monitoring means 7 does not detect change of depressing position (NO in the step S2). In this case, the comparing means 6 determines whether the depressing pressure indicated by the depressing signal from the touch panel device 2 has exceeded the reference depressing pressure or not (step S3). When a user depresses the touch panel 9 with a higher pressure and the comparing means 6 determines the depressing pressure has exceeded the reference value (YES in the step S3), the process selecting means 5 discriminates which icon on the touch panel 9 is depressed with the depressing position signal from the touch panel device 2 and the process selecting means 5 selects execution of the application (VTR control) corresponding to the discriminated icon (VTR icon 502). As a result, CPU 301 of the personal computer 3 loads the such application program to the memory 301 from the hard disk device 302 and operates on the basis of such program to realize the functions of the application of VTR control (step S4).

As explained above, in this embodiment, when a user depresses the touch panel 9 on the icon with a higher pressure, the application corresponding to such icon is executed.

Meanwhile, when a user depresses the position of VTR icon 502 on the touch panel 9 with a weak pressure, result of determination by the comparing means 6 in the step S3 is NO. In this case, the process selecting means 5 selects the high-light display (display by increased luminance) of icons as the process to be executed and instructs the display control means 8 to execute the high-light display of icons. Upon reception of this instruction, the display control means 8 identifies the icon for the high-light display with the depressing position signal supplied from the touch panel device 2 and the designated VTR icon 502 is displayed, as a result, by the high-light display mode (step S5).

That is, when a user depresses the touch panel 9 on the icon with a weak pressure, such icon is displayed by the high-light display mode.

When a user depresses one icon or a plurality of icons (for example, DVD icon 504, CAMERA icon 508) sequentially with a weak pressure, the process selecting means 5 selects the high-light display of these icons as the process to be executed. As a result, the icon newly depressed with a weak pressure is respectively displayed by the high-light display mode.

Figure 6B:
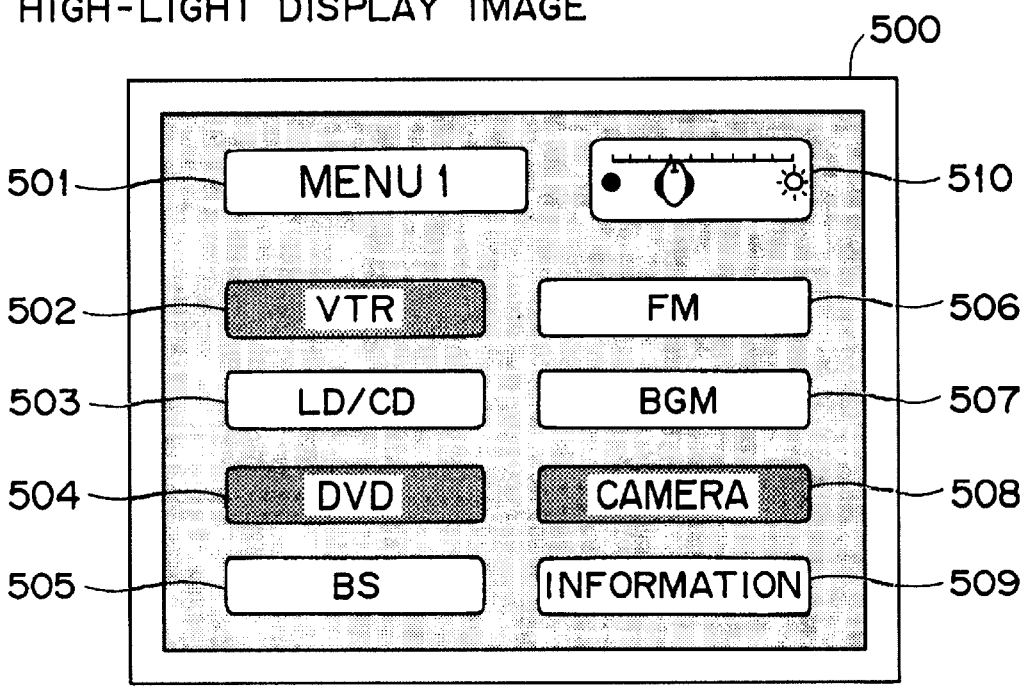

FIG. 6B shows a menu image 500 displayed by the high-light display mode as explained above. In FIG. 6B, VTR icon 502, DVD icon 504 and CAMERA icon 508 are displayed by the high-light display mode.

Therefore, in this embodiment, when the manipulation to sequentially drive a plurality of applications is required, the icons of such applications may be displayed previously by the high-light display mode and the required application can be driven accurately by sequentially depressing the icon displayed by the high-light display mode with a higher pressure.

On the other hand, when a user moves the finger while the touch panel is being depressed, result of determination in the step S1 is YES. In this case, the process selecting means 5 selects the process different from that executed when the finger is not moved, depending on whether the touch panel 9 is depressed with a higher pressure or not.

For example, when a user depresses the knob position of the slide volume control 510 among various icons of FIG. 5 and moves the finger to shift the knob, the process selecting means 5 recognizes that the knob position is depressed with the depressing position signal from the touch panel device 2 to identify the moving direction and moving distance of finger. The process selecting means 5 selects the image alteration process of the slide volume control 510 and notifies the moving direction and moving distance of finger to the display control means 8. Thereby the image of the slide volume control 510 under the condition that the knob is moved is displayed on the display device 4 by the display control means 8.

However, in this case, when the comparing means 6 determines that the depressing pressure indicated by the depressing pressure signal has exceeded the reference value (YES in the step S6), the process selecting means 5 selects any one or the process to increase the brightness of display or the process to decrease the brightness of display depending on the moving direction of finger and issues an instruction to change brightness of display depending on the selection result to the display control means 8.

Namely, when a user has moved the knob of slide volume control 510 in any direction by depressing the knob with a higher pressure, the knob of the slide volume control 510 on the display screen moves and brightness of display changes depending on the moving direction and moving distance of finger (step S7).

Brightness control of display depending on the movement of finger can be realized by the process that the process selecting means 5 calculates amount of control output from the slide volume control 510 and then sends this value to the display control means 8 on the basis of the initial setting position of knob of the preset slide volume control 510 and the depressing position signal from the touch panel device 2 and the display control means 8 controls the display device 4 depending on the amount of control transferred.

The process selecting means 5 continuously issues an instruction to the display control means 8 so that movement of knob and brightness of display follow the movement of finger while the signal monitoring means 7 continuously detects change of the depressing position of finger (YES in the step S8). When the signal monitoring means 7 detects that the depressing position of finger does not change (NO in the step S8), the process selecting means 5 issues an instruction to the display control means 8 to stop the movement of knob and reads the position where change of depressing position of finger disappears on the basis of the depressing position signal from the touch panel device 2, sends the amount of control (fixed value) of the slide volume control 510 to the display control means 8 depending on the value of position read out and the display control means 8 then fixes the brightness of display of display device to that corresponding to the amount of control (step S9). Thereby, slide volume control process is completed (step S10).

Meanwhile, when the comparing means 6 determines that the depressing pressure indicated by the depressing pressure signal from the touch panel 2 is lower than the reference value (NO in the step S6), the process selecting means 5 does not issue the instruction to change the brightness of display to the display control means 8.

Therefore, in this case, only the image of the slide volume control 510 displayed on the liquid crystal display panel is altered and the knob of the slide volume control 510 is moved depending on the movement of finger (step S11).

The process selecting means 5 continuously issues, while the signal monitoring means 7 is continuously detecting change of the depressing position of finger (YES in the step S12), the instruction to the display control means 8 so that movement of the knob follows the movement of finger. When the signal monitoring means 7 determines that there is no change of the depressing position of finger (NO in the step S12), the process selecting means 5 issues an instruction to the display control means 8 to stop the movement of knob and thereby the knob stops at the position where the finger stops (step S13).

Thereafter, when a user depresses the knob position with a higher pressure, the comparing means 12 determines that the depressing pressure indicated by the depressing pressure signal has exceeded the reference value (YES in the step S14). As a result, the process selecting means 10 selects the process to alter the brightness of display and instructs the display control means 16 to change brightness of display (step S15) to complete the slide volume control process.

Here, the process selecting means 5 issues an instruction (in the step S17), when the comparing means 6 determines that depression is not made by finger with a higher pressure after the process to stop the knob in the step S13 (NO in the step S14), to the display control means 5 to return the knob to the position before the movement. Thereby, the slide volume control process is completed (step S18).

Accordingly, when the knob is moved with a weak depressing pressure, knob position and display brightness are simultaneously altered after the knob is depressed with a higher pressure after the movement, but when the knob is not depressed with a higher pressure after the movement, both knob position and display brightness are not changed simultaneously.

As explained above, in this embodiment, the process to be executed can be selected in the diversified manipulation modes equivalent to the mouse because, since the process to be executed is selected on the basis of not only the depressing position on the touch panel 9 but also the depressing pressure to the touch panel 9, the icons are displayed by the high-light mode when the depressing force is weak as explained above and application is activated when the depressing pressure is higher, or only the knob of t he slide volume control image is moved when the depressing pressure is weak and the knob can be moved while the display brightness is actually changed when the depressing pressure is higher.

Figure 7A:
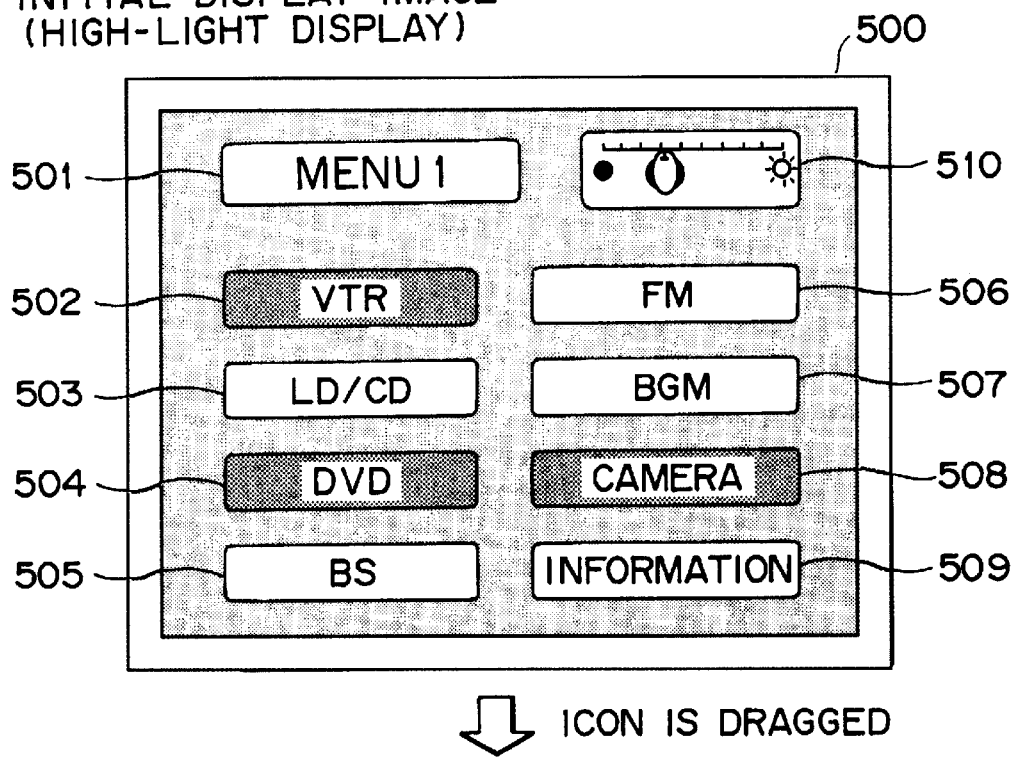
FIG. 7 is a diagram showing an example of a menu image after various processes displayed on the display device of the information processing apparatus of the present invention.
Figure 7B:
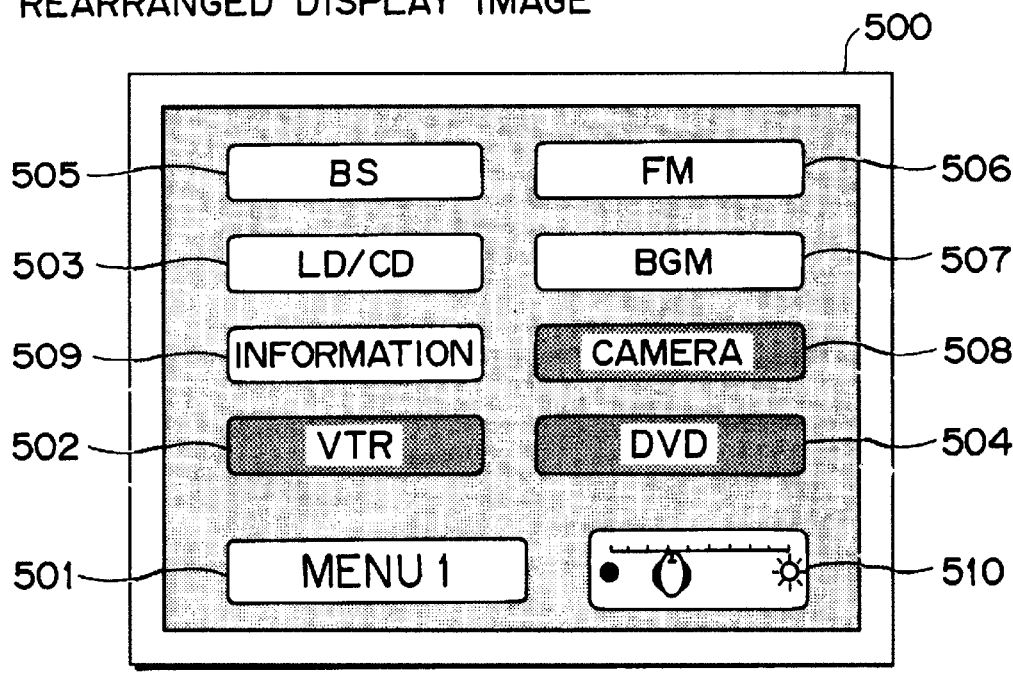
Figure 8:
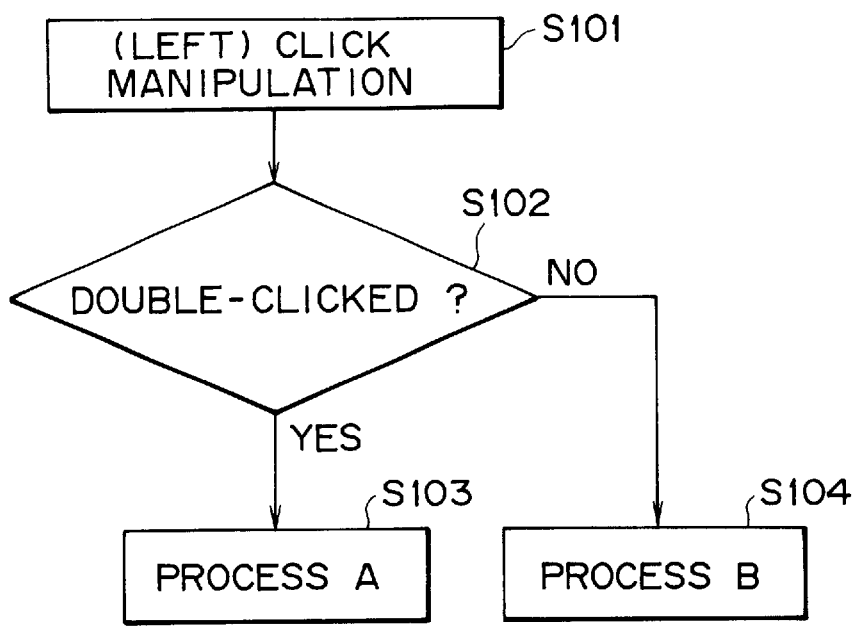
FIG. 8 is a flowchart showing an example of manipulations by a mouse.
Figure 9:
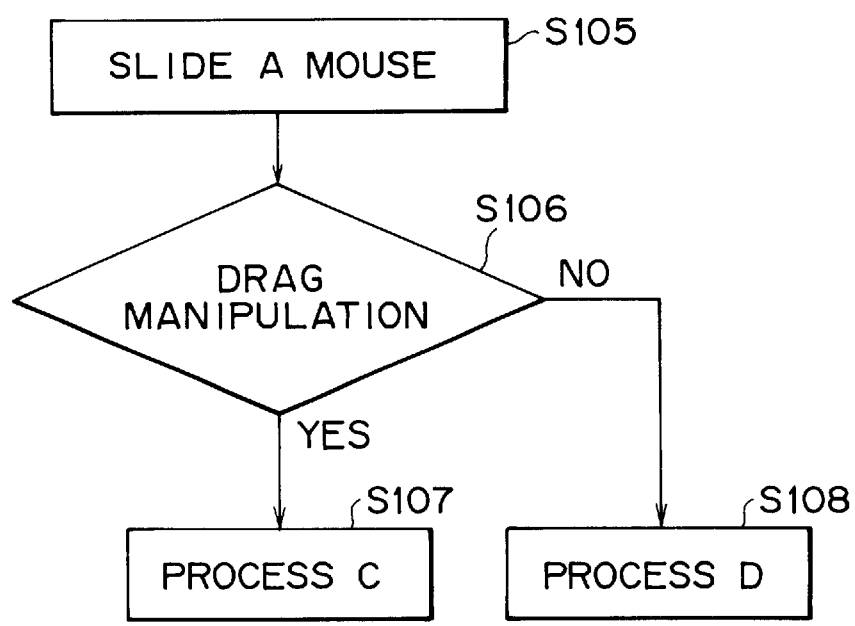
FIG. 9 is a flowchart showing the other example of manipulations by a mouse.

When an icon, for example, is depressed with a weak pressure intermittently for two times or more and the finger is then moved without limitation to the slide volume control as explained above, such icon can be moved on the display screen. FIG. 7 shows the arrangement of icons by conducting the moving process to the initial display image (FIG. 7A) of the high-light display mode. Thereby, manipulation flexibility on the menu image can remarkably be improved. Moreover, when the icon is depressed with a higher pressure after it is moved to the target position, it can be realized easily, for example, to drive the application corresponding to such icon.

Moreover, it is also possible to form the structure that when the icon is depressed with a weak pressure and the depressing position is not changed, the process selecting means 5 selects the high-light display of icon as explained above, but thereafter when the same icon is depressed with a weak pressure, the process selecting means 5 controls the display control means 8 to cancel the high-light display of the icon. In this case, a user can reset the icon in the high-light display mode to the initial display mode as required.

Moreover, in this embodiment, the brightness of display is changed by manipulation of the slide volume control 510, but when the information processing apparatus 1 is provided with the function to generate voices, it is of course possible to adjust the sound level by the process and manipulation same as those for the slide volume control.

Further, in this embodiment, when the icon is depressed with a weak pressure, this icon is displayed by the high-light display mode and when it is depressed with a higher pressure, an application is driven but the process to be selected by the process selecting means 5 is not limited to such process and can be set variously.

Since the pressure given at the time of depressing the touch panel 9 is different depending on the user, manipulation flexibility can be improved by providing the structure that a user can freely set the reference value to be compared with the depressing pressure by the comparing means 6.

In addition, in this embodiment, the comparing means 6 determines whether the depressing pressure has exceeded the reference value or not and the process selecting means 5 has selected the process depending on the result of determination. But, it is also possible to continuously recognize the level of depressing pressure to select the process on the basis of the way of change of the depressing pressure or to select many processes depending on the level of the depressing pressure.

Moreover, in this embodiment, the touch panel device 2 is laid on the display screen of the display device 4, but the present invention is not limited thereto and the touch panel device 2 can be provided in isolation from the display device 4 by indicating with a marker the depressing position of the touch panel device 2 on the display screen of the display device 4 and giving correspondence between the touch surface of the touch panel device 2 and the display screen of the display device 4.

What is claimed is:

1. An information processing apparatus including a display device for displaying images in relation to the predetermined processes among a plurality of different processes and a touch panel device for outputting a depressing position signal indicating the depressing position on the touch panel and a depressing pressure signal indicating the depressing pressure on the touch panel in view of respectively executing a plurality of processes explained above depending on said depressing position signal and said depressing pressure signal, comprising:

comparing means for comparing said depressing pressure indicated by said depressing pressure signal from said touch panel device with the reference depressing pressure;

propagating means for propagating a surface elastic wave, and then comparing successively generated surface elastic waves to detect said depressing position by a change in said surface elastic wave;

monitoring means for monitoring change of the depressing position indicated by said depressing position signal depending on said depressing position signal from said touch panel device;

processing means for selecting and processing the process to be executed among a plurality of said processes depending on an output of said touch panel device, an output of said comparing means and an output of said monitoring means; and display control means for modifying said display image displayed on said display device depending on an output of said touch panel device, an output of said monitoring means and said process selected by said processing means.

2. An information processing apparatus as claimed in claim 1, wherein said processing means includes a luminance processing means for controlling said display control means, when an output is generated from said touch panel device, to increase the luminance and maintains such luminance until the next change for the image corresponding to the depressing position among said images displayed on said display device when an output of said comparing means indicates that said depressing pressure signal is smaller than said reference depressing pressure and an output of said monitoring means indicates that there is no change in said depressing position.

3. An information processing apparatus as claimed in claim 1, wherein said processing means includes a varying device control means for controlling said display control means to display on said display device a typical image of the varying device including a control knob indicating the setting position for amount of control, controlling said display control means, when said touch panel device generates an output, so that said knob displayed on said display device changes following said depressing position when an output of said comparing means indicates that said depressing pressure signal is smaller than said reference depressing pressure and an output of said monitoring means indicates that said depressing position changes continuously, next outputting a control amount signal indicating the amount of control corresponding to the setting position where said change disappears when an output of said monitoring means indicates that there is no change of said setting position and an output of said comparing means indicates that said depressing pressure signal is larger than said reference depressing pressure, and controlling said display control means so that said knob displayed on said display device changes following said depressing position and also outputting a control amount signal indicating amount of control which changes following the setting position of said knob when an output of said comparing means indicates that said depressing pressure signal is larger than said reference depressing pressure and said monitoring means indicates that said depressing position changes continuously.

4. An information processing apparatus as claimed in claim 1, wherein the depressing surface of said touch panel device is transparent and is laid on the display surface of said display device.

5. An information processing apparatus as claimed in claim 1, wherein said processing means comprises a memory for storing program data for a plurality of processes and a CPU (Central Processing Unit) for controlling execution of a plurality of processes on the basis of an output of said touch panel device, an output of said comparing means and a program data of said memory.

6. A method of controlling display of an information processing apparatus comprising a display device to display images in relation to the predetermined process among a plurality of different processes and a touch panel device to output a depressing position signal indicating the depressing position on the touch panel and a depressing pressure signal indicating the depressing pressure for the touch panel in view of executing a plurality of different processes depending on said depressing position signal and said depressing pressure signal, comprising:

comparing step for comparing said depressing pressure indicated by said depressing pressure signal from said touch panel device with the reference depressing pressure;

propagating step for propagating a surface elastic wave; and then comparing successively generated surface elastic waves to detect said depressing position by a change in said surface elastic wave;

monitoring step for monitoring change of the depressing position indicated by said depressing position signal depending on said depressing position signal form said touch panel device; and luminance processing step for executing the process to control said display device, on the occasion that said touch panel has generated an output, to increase the luminance and maintain such luminance until the next change for the image corresponding to the depressing position among the images in relation to said predetermined process indicated on said display device when the result of said comparing step indicates that said depressing pressure signal is smaller than said reference depressing pressure and when the result of said monitoring step indicates that said depressing position does not change.

7. A method of controlling display of an information processing apparatus including a display device for displaying images in relation to the predetermined processes among a plurality of different processes and a touch panel device to output a depressing position signal indicating the depressing position on the touch panel and a depressing pressure signal indicating the depressing pressure for the touch panel in view of executing a plurality of different processes depending on said depressing position signal and said depressing pressure signal, comprising:

comparing step for comparing said depressing pressure indicated by said depressing pressure signal from said touch panel device with the reference depressing pressure;

propagating step for propagating a surface elastic wave; and then comparing successively generated surface elastic waves to detect said depressing position by a change in said surface elastic wave;

monitoring step for monitoring change of the depressing position indicated by said depressing position signal depending on said depressing position signal form said touch panel device; and varying device control processing step for controlling said device to display on said display device to display on said display device a typical image of the varying device including a control knob indicating the setting position for amount of control, controlling said display device, when said touch panel device generates an output, so that said setting position of said knob displayed on said display device changes following said depressing position when the result of said comparing step indicates that said depressing position signal is smaller than said reference depressing pressure and the result of said monitoring step indicates that said depressing position changes continuously, next outputting a control amount signal indicating the amount of control corresponding to the setting position where said change disappears when the result of said monitoring step indicates that there is no change of said setting position and the result of said comparing step indicates that said depressing pressure signal is larger than said reference depressing pressure, and controlling said display device so that said knob displayed on said display device changes following said depressing position and also outputting a control amount signal indicating amount of control which changes following the setting position of said knob when the result of said comparing step indicates that said depressing pressure signal is larger than said reference depressing pressure and the result of said monitoring step indicates that said depressing position changes continuously.

* * * * *